United States Patent
Claxton (10) Patent No.: US 9,328,483 B2
(45) Date of Patent: May 3, 2016

(54) METHOD FOR DETERMINING LOAD ON POWER SHOVEL MEMBER

(71) Applicant: Flanders Electric Motor Service, Inc., Evansville, IN (US)

(72) Inventor: Richard L. Claxton, Evansville, IN (US)

(73) Assignee: Flanders Electric Motor Service, Inc., Evansville, IN (US)

( * ) Notice: Subject to any disclaimer, the term of this patent is extended or adjusted under 35 U.S.C. 154(b) by 92 days.

(21) Appl. No.: 14/309,831

(22) Filed: Jun. 19, 2014

(65) Prior Publication Data

US 2014/0336870 A1 Nov. 13, 2014

Related U.S. Application Data

(62) Division of application No. 13/795,703, filed on Mar. 12, 2013, now Pat. No. 8,788,155.

(60) Provisional application No. 61/672,131, filed on Jul. 16, 2012.

(51) Int. Cl.

| | |
|---|---|
| *G01L 5/06* | (2006.01) |
| *E02F 9/26* | (2006.01) |
| *E02F 3/43* | (2006.01) |
| *G01L 25/00* | (2006.01) |
| *G01L 1/04* | (2006.01) |
| *E02F 3/30* | (2006.01) |
| *E02F 3/46* | (2006.01) |
| *E02F 9/20* | (2006.01) |
| *G01L 5/10* | (2006.01) |
| *G01G 19/08* | (2006.01) |
| *G01G 23/01* | (2006.01) |
| *E02F 3/36* | (2006.01) |
| *G01L 27/00* | (2006.01) |
| *G01L 5/00* | (2006.01) |

(52) U.S. Cl.
CPC . *E02F 9/26* (2013.01); *E02F 3/304* (2013.01); *E02F 3/36* (2013.01); *E02F 3/435* (2013.01); *E02F 3/46* (2013.01); *E02F 9/2025* (2013.01); *E02F 9/2029* (2013.01); *E02F 9/265* (2013.01); *E02F 9/267* (2013.01); *G01G 19/083* (2013.01); *G01G 23/01* (2013.01); *G01L 1/04* (2013.01); *G01L 5/0061* (2013.01); *G01L 5/06* (2013.01); *G01L 5/108* (2013.01); *G01L 25/00* (2013.01); *G01L 27/002* (2013.01)

(58) Field of Classification Search
None
See application file for complete search history.

(56) References Cited

U.S. PATENT DOCUMENTS

| | | | |
|---|---|---|---|
| 4,776,751 A | 10/1988 | Saele | |
| 5,408,767 A * | 4/1995 | Hazama | E02F 9/265 37/384 |

(Continued)

OTHER PUBLICATIONS

International Search Report and Written Opinion (dated Jul. 8, 2015) regarding International Application No. PCT/US2015/026082.

(Continued)

*Primary Examiner* — John R Olszewski
*Assistant Examiner* — James M McPherson
(74) *Attorney, Agent, or Firm* — Chetlin IP, P.C.

(57) ABSTRACT

A method of determining a load on at least one member of a power shovel may include the steps of: sensing a strain in a boom of the power shovel; determining a plurality of member joint loads based on strain sensed in the boom; and determining the load on the at least one member of the power shovel from the plurality of member joint loads.

10 Claims, 8 Drawing Sheets

(56) References Cited

U.S. PATENT DOCUMENTS

| | | | |
|---|---|---|---|
| 5,461,803 A | 10/1995 | Rocke | |
| 5,822,891 A | 10/1998 | Fujishima et al. | |
| 6,025,686 A | 2/2000 | Wickert et al. | |
| 6,496,766 B1 | 12/2002 | Bernold et al. | |
| 7,912,612 B2 | 3/2011 | Janardhan et al. | |
| 8,032,313 B2 | 10/2011 | Claxton | |
| 8,209,096 B2 | 6/2012 | Claxton | |
| 8,355,847 B2 | 1/2013 | Colwell et al. | |
| 8,359,143 B2 | 1/2013 | Colwell et al. | |
| 8,370,031 B2 | 2/2013 | Claxton | |
| 8,515,627 B2 | 8/2013 | Marathe et al. | |
| 8,560,183 B2 | 10/2013 | Colwell et al. | |
| 8,571,766 B2 | 10/2013 | Colwell et al. | |
| 8,620,536 B2 | 12/2013 | Colwell et al. | |
| 8,660,758 B2 | 2/2014 | Janardhan et al. | |
| 2004/0117095 A1* | 6/2004 | Colburn | E02F 9/264 701/50 |
| 2006/0243180 A1* | 11/2006 | Sundermeyer | A01B 63/00 112/470.06 |
| 2007/0266601 A1* | 11/2007 | Claxton | E02F 3/30 37/396 |
| 2008/0319710 A1* | 12/2008 | Hsu | G01G 19/083 702/174 |
| 2010/0100338 A1 | 4/2010 | Vik et al. | |
| 2011/0106384 A1* | 5/2011 | Corke | E02F 3/54 701/50 |
| 2012/0101693 A1 | 4/2012 | Taylor | |
| 2012/0263566 A1 | 10/2012 | Taylor et al. | |
| 2012/0275893 A1 | 11/2012 | Colwell et al. | |
| 2012/0277959 A1* | 11/2012 | Colwell | E02F 3/46 701/50 |
| 2013/0018638 A1* | 1/2013 | Taylor | E02F 9/264 703/2 |
| 2013/0051963 A1 | 2/2013 | Taylor | |
| 2013/0110460 A1 | 5/2013 | Taylor | |

OTHER PUBLICATIONS

PCT International Search Report and Written Opinion, PCT Application No. PCT/US2013/050282, dated Dec. 20, 2013, 7 pages.

* cited by examiner

METHOD FOR DETERMINING LOAD ON POWER SHOVEL MEMBER

CROSS-REFERENCES TO RELATED APPLICATIONS

This application is a division of U.S. patent application Ser. No. 13/795,703, filed Mar. 12, 2013, and claims the benefit of U.S. Provisional Patent Application No. 61/672,131, filed on Jul. 16, 2012, which is hereby incorporated herein by reference for all that it discloses.

TECHNICAL FIELD

The present invention relates to excavation machines in general and more particularly to systems and methods for improving the performance of shovel-type excavation machines.

BACKGROUND

A power shovel is a type of excavation machine that has been used for decades to dig or extract material from a work site. Power shovels are commonly used for the excavation and removal of ore and/or overburden in mining operations, although they are also used in other applications as well.

While power shovels come in a wide range of sizes and configurations, most involve a cab or "house" that is pivotally mounted to an undercarriage assembly. The undercarriage assembly may be provided with a plurality of tracks or wheels to allow the shovel to be moved from place to place. A crane or boom member mounted to the cab is supported in an elevated position by means of one or more suspension ropes. The boom supports a stick or handle member having a bucket or dipper mounted on the end thereof. The handle member is moveably mounted to the boom via a saddle block assembly that allows the handle member to pivot and translate with respect to the boom. Pivotal movement of the handle is typically accomplished by means of one or more hoist ropes connected to the dipper. Translational movement of the handle with respect to the boom, commonly referred to as "crowd," is typically accomplished via a rack and pinion gear set provided on the saddle block assembly, although other arrangements are known and may be used.

Most power shovels are electrically operated, with various types of electric motors being used to move or operate the various elements of the shovel to pull the dipper through the material to be excavated and thereafter deposit the excavated material contained in the dipper at a suitable location (e.g., into the bed of a haul truck). A typical work cycle for a power shovel involves four primary phases or steps, commonly referred to as digging, swinging, dumping, and returning. The digging phase consists of "crowding" the dipper into the bank, hoisting the dipper to fill it, then retracting it from the bank. Once the dipper is clear of the bank, the dipper is moved through a swing path (i.e., by rotation of the cab with respect to the undercarriage) until it is positioned over the designated dump location. During the dumping phase, the dipper door is opened to dump the load. Thereafter, the dipper door is closed and the dipper returned to position adjacent the bank for the next work cycle.

SUMMARY OF INVENTION

In one embodiment of the present invention, a method of determining a load on at least one member of a power shovel may include the steps of: Sensing a strain in a boom of the power shovel; determining a plurality of member joint loads based on the strain sensed in the boom; and determining the load on the at least one member from the plurality of joint loads.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
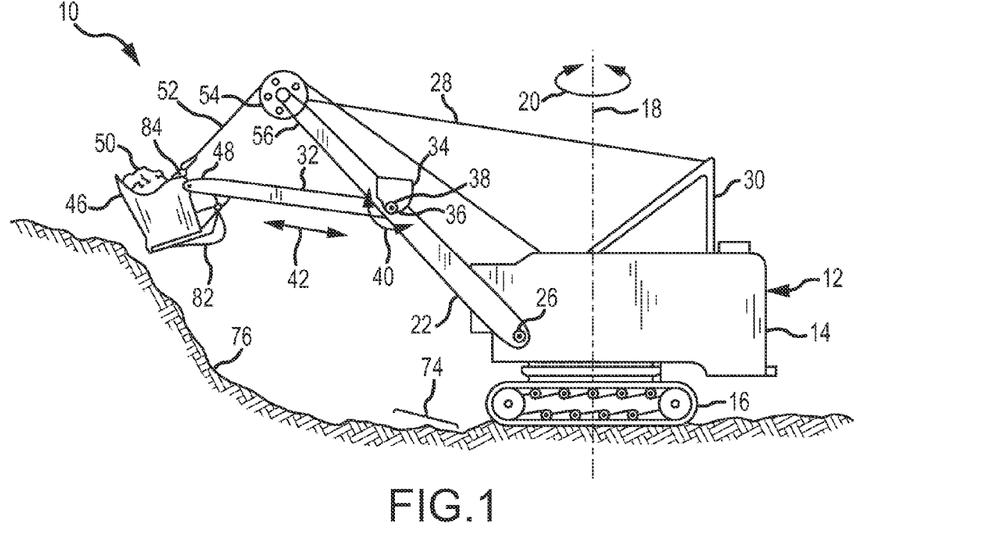
FIG. 1 is a side view in elevation of a power shovel that may embody the optimized bank penetration system according to the present invention.
Figure 2:
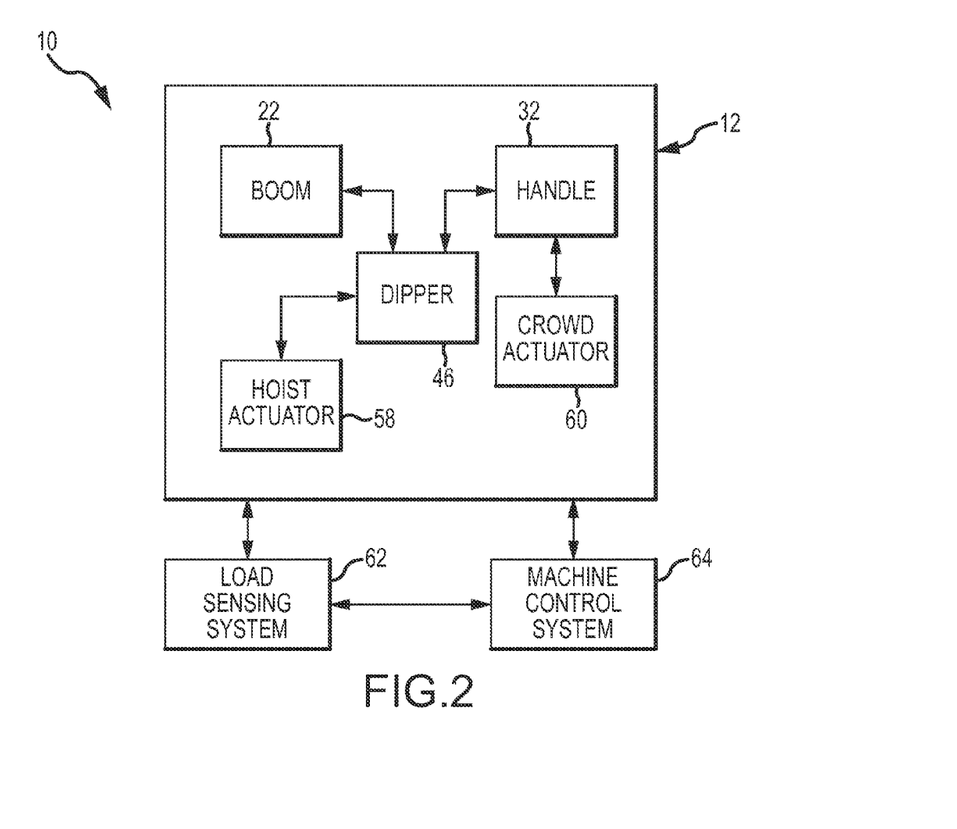
FIG. 2 is a schematic representation of the power shovel shown in FIG. 1 showing the operational relationship of various elements and actuators thereof.

An optimized bank penetration system 10 according to one embodiment of the present invention is best seen in FIGS. 1 and 2 as it could be implemented on a power shovel 12 of the type well-known in the art. Power shovel 12 may comprise a house or cab 14 that is pivotally mounted to a tracked undercarriage 16. The pivotal mounting arrangement allows the cab 14 to pivot or rotate with respect to undercarriage 16 about pivot axis 18, generally in the directions indicated by arrows 20. A boom member 22 is mounted to the house or cab 14 by a pinned "foot" joint 26. Boom 22 may be supported or held in a desired position by one or more suspension ropes 28 affixed to a back stay assembly 30 of cab 14.

A stick or handle member 32 is movably mounted to the boom 22 by a saddle block assembly 34. Saddle block assembly 34 allows handle 32 to pivot with respect to boom 22 about a pivot axis 36 defined by a joint 38, generally in the directions indicated by arrows 40. Saddle block assembly 34 also allows the handle 32 to translate with respect to boom 22 in a motion known as "crowd," as indicated by arrows 42. In the particular embodiment shown and described herein, the saddle block assembly 34 comprises a rack and pinion drive system 44 that moves the handle 32 in the crowd direction 42. See FIG. 13. A dipper or bucket 46 mounted to distal end 48 of handle 32 holds the payload 50. Dipper 46 may be supported by one or more hoist ropes 52 passing over a sheave 54 mounted to distal end 56 end of boom 22.

The various members of the power shovel 12 may be moved with respect to one another by various actuators. For example, a hoist actuator or motor 58 (FIG. 2) provided in cab 14 and operatively associated with the hoist rope 52 may be used to raise and lower the dipper 46. Similarly, a crowd actuator or motor 60 (FIG. 2) operatively associated with the rack and pinion drive system 44 (FIG. 13) of saddle block assembly 34 may be used to control the crowd 42.

The optimized bank penetration system 10 may also comprise a load sensing system 62 and a machine control system 64, as best seen in FIG. 2. The load sensing system 62 provides a means for determining a load in a variety of the member joints of shovel 12. The machine control system 64 is operatively associated with the load sensing system 62 and the various actuators of power shovel 12. Machine control system 64 controls the various actuators of the power shovel 12 (e.g., the hoist actuator 58 and/or crowd actuator 60) to achieve the objects and advantages associated with the optimized bank penetration system 10.

Figure 3:
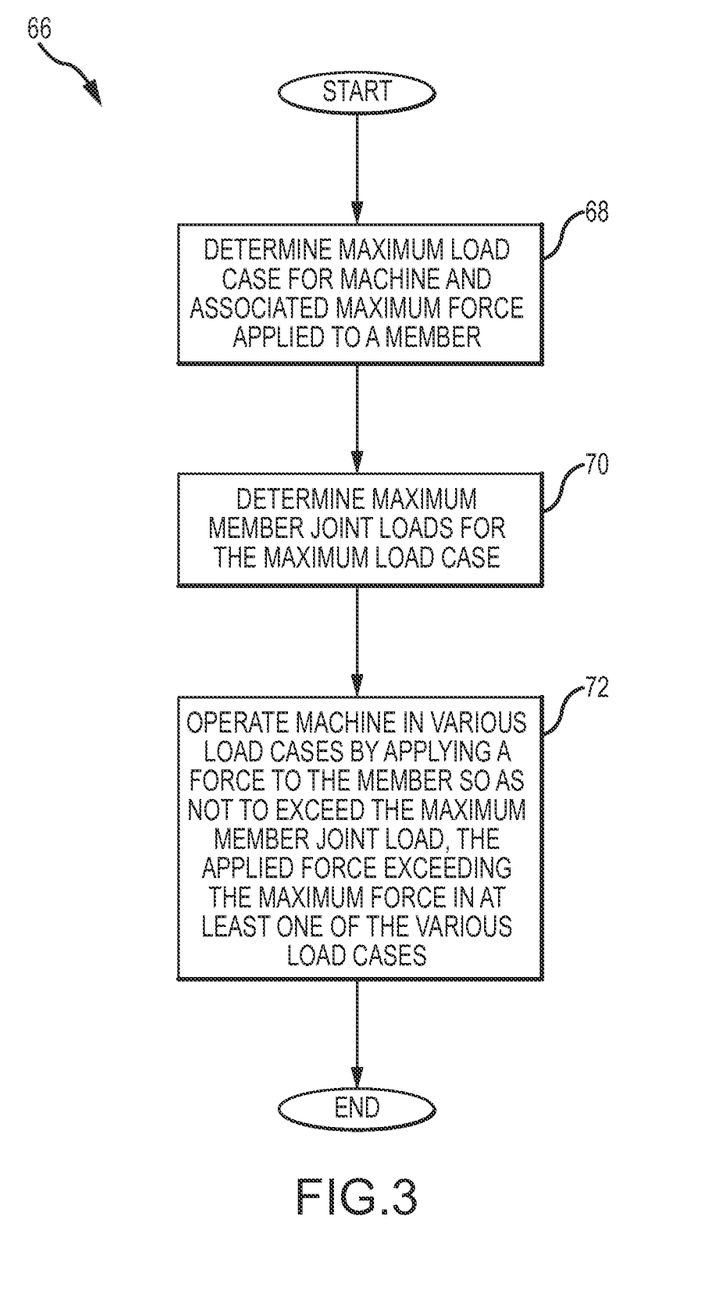
FIG. 3 is a flow chart representation of an optimized bank penetration method according to one embodiment of the present invention.

More specifically, and with reference now primarily to FIG. 3, the optimized bank penetration system 10 may be operated in accordance with a method 66. A first step 68 of method 66 involves the determination of a maximum load case or condition for the machine or power shovel 12. As will be described in further detail below, the maximum load case or condition involves a specific machine configuration, payload state, and applied forces (e.g., hoist rope and/or crowd forces) that place maximum stress on the power shovel 12.

Once the maximum load case has been determined for the particular power shovel 12, the corresponding loads in each of the member joints are then determined in step 70. The loads imposed on the various joints in the maximum load case are referred to herein as "maximum member joint loads," whereas the loads imposed on the various joints for all other loading cases are referred to herein as simply "member joint loads."

After the maximum member joint loads are determined (i.e., for the maximum load case) in step 70, step 72 is then performed in which the optimized bank penetration system 10 operates power shovel 12 in a manner that will maintain the member joint loads at or below the maximum member joint loads. The system 10 does so regardless of the particular load case that is imposed on the shovel 12. Significantly, and as will be described in much greater detail herein, the optimized bank penetration system 10 will allow the various actuators (e.g., hoist actuator 58 and crowd actuator 60) to apply forces (e.g., hoist rope and/or crowd forces) to the various members of the power shovel 12 in excess of the forces that would otherwise be permitted in the maximum load case, all while maintaining the member joint loads at or below the maximum member joint loads.

Some of the more significant aspects and advantages of the bank penetration optimization system 10 according to the present invention can be better understood and appreciated by comparing it with prior art systems for operating power shovels.

In a typical prior art scenario, an operational performance "envelope" for the power shovel 12 is created or developed in accordance with the maximum load case for the shovel 12. In the example shovel embodiment 12 shown in FIG. 1, the maximum load case consists of a geometric or positional configuration that involves maximum dipper payload 50, vertical "sticks," and maximum crowd extension. This configuration or maximum load case imposes the maximum stresses on the shovel 12, with the structure of the shovel 12 being subjected to maximum bending moments and loads. Accordingly, the loads on the various members (e.g., cab 14, boom 22, handle 32, and dipper 46) are determined or calculated based on the maximum load case. The various joints and members of the shovel 12 are then designed in accordance with the maximum load case. However, in most shovel designs, the various actuators, and in particular the hoist and crowd actuators 58 and 60, are capable of developing forces that would exceed the permitted loadings of the various shovel elements in the maximum load case. Consequently, such actuators are commonly governed or limited so that the maximum forces that can be applied thereby will not exceed the forces permitted in the maximum load case. The governing or limitation of such actuators may be accomplished via their respective control systems (e.g., by limiting the torques that can be applied by the various drive motors), or by using smaller drive systems that are capable of delivering or applying only those forces permitted in the maximum load case.

The optimized bank penetration system 10 of the present invention involves a recognition that limiting or governing the maximum forces that can be applied by the various actuators (i.e., the host and crowd actuators 58 and 60) to those permitted in maximum load case will limit the performance envelope for the shovel in other load cases. For example, in load cases other than the maximum load case, e.g., when the dipper 46 is at a toe region 76, just entering a bank 78 (FIG. 1), it would be possible, and indeed advantageous, to operate the hoist and/or crowd actuators 58 and 60 to apply forces that are considerably greater than the governed or maximum forces that would permitted in the maximum load case. As mentioned, it is not possible to operate conventional power shovels with such increased hoist and/or crowd forces because the respective actuators are limited or governed based on the maximum load case. As a consequence, prior art shovel systems cannot be operated so as to gain or derive optimal performance (e.g., digging speed, capacity, etc.) from the shovel 12 in load cases other than the maximum load case.

In contrast to prior art shovel systems, the optimal bank penetration system 10 of the present invention allows the shovel 12 to be operated at or near optimal performance levels in other load cases. Stated simply, the performance envelope of a shovel 12 embodying the optimal bank penetration system 10 can be enlarged or increased in other load cases. For example, in the load case when the dipper 46 is positioned at the toe 74 and is just entering the bank 76, the optimal bank penetration system 10 of the present invention will allow the hoist and/or crowd forces (i.e., applied by the hoist and crowd actuators 58 and 60) to exceed those forces permitted in the maximum load case, thereby allowing for increased productivity of the shovel 12 during the digging phase.

Having briefly described one embodiment of the optimized bank penetration system 10 according to the present invention, as well as some of its more significant features and advantages, various exemplary embodiments of the invention will now be described in detail. However, before proceeding with the description, it should be noted that the various embodiments of the present invention are shown and described herein as they could be implemented on a conventional power shovel 12 of the type commonly used in mining and quarrying operations. However, it should be understood that the present invention could be implemented or practiced on other types of digging machines that are now known in the art or that may be developed in the future. Of course, the present invention may also be used in conjunction with other types of machines and in other applications wherein it would be desirable to allow the performance of the machine to be optimized in load cases other than the maximum load case, as would become apparent to persons having ordinary skill in the art after having become familiar with the teachings provided herein. Consequently, the present invention should not be regarded as limited to the particular devices, systems, and applications shown and described herein.

Referring back now to FIGS. 1 and 2, the optimized bank penetration system 10 is shown and described herein as it could be applied to or implemented on an existing power shovel 12 already in operation. That is, the power shovel 12 has been provided or retro-fitted with the optimized bank penetration system 10 while in the field. Alternatively, the optimized bank penetration system 10 could be provided to new power shovel systems during manufacture.

Regardless of whether the optimized bank penetration system 10 is provided on a new or existing machine, power shovel 12 may comprise a house or cab 14 that is pivotally mounted to a tracked undercarriage 16. The pivotal mounting arrangement allows the cab 14 to pivot or swing with respect to undercarriage 16 about pivot axis 18, i.e., generally in the directions indicated by arrows 20. Boom member 22 is mounted to the house or cab 14 by pinned foot joint 26 and may be supported or held in a desired elevated position by one or more suspension ropes 28. In one embodiment, suspension ropes 28 are mounted or affixed to back stay assembly 30 mounted to cab 14, as best seen in FIG. 1.

As briefly described above, the stick or handle member 32 may be mounted to the boom 22 by saddle block assembly 34. Saddle block assembly 34 allows handle 32 to pivot with respect to boom 22 about pivot axis 36 defined by joint 38. Saddle block assembly 34 also allows the handle 32 to translate with respect to boom 22, i.e., in the crowd direction, as indicated by arrows 42. In the particular embodiment shown and described herein, saddle block assembly 34 comprises a rack and pinion drive system 44 (FIG. 13) in which a drive pinion 78 engages a gear rack 80 mounted to the stick 32. Drive pinion 78 is operatively connected to the crowd actuator or motor 60 (FIG. 2). Rotation of the drive pinion 78 causes the handle 32 to move back and forth in the direction indicated by arrows 42 to control the crowd.

The dipper or bucket 46 is mounted to the distal end 48 of handle 32 and is provided with a door 82 to allow payload 50 to be released from dipper 46. The dipper or bucket 46 may be connected to one or more hoist ropes 52 by means of a bail assembly 84. The hoist ropes 52 pass over sheave 54 mounted to the distal end 56 of boom 22 and are operatively connected to the hoist actuator 58 (FIG. 2) provided within cab 14. The hoist actuator 58 may then raise and lower dipper 46 via hoist ropes 52.

Power shovel 12 may also comprise a number of additional systems and devices, such as one or more power plants, electrical systems, hydraulic systems, pneumatic systems, etc. (not shown), that may be required or desired for the operation of the particular power shovel 12. However, because such additional systems and devices are well known in the art and are not required to understand or implement the present invention, such additional systems and devices that may be utilized in any particular power shovel 12 will not be described in further detail herein.

Figure 5:
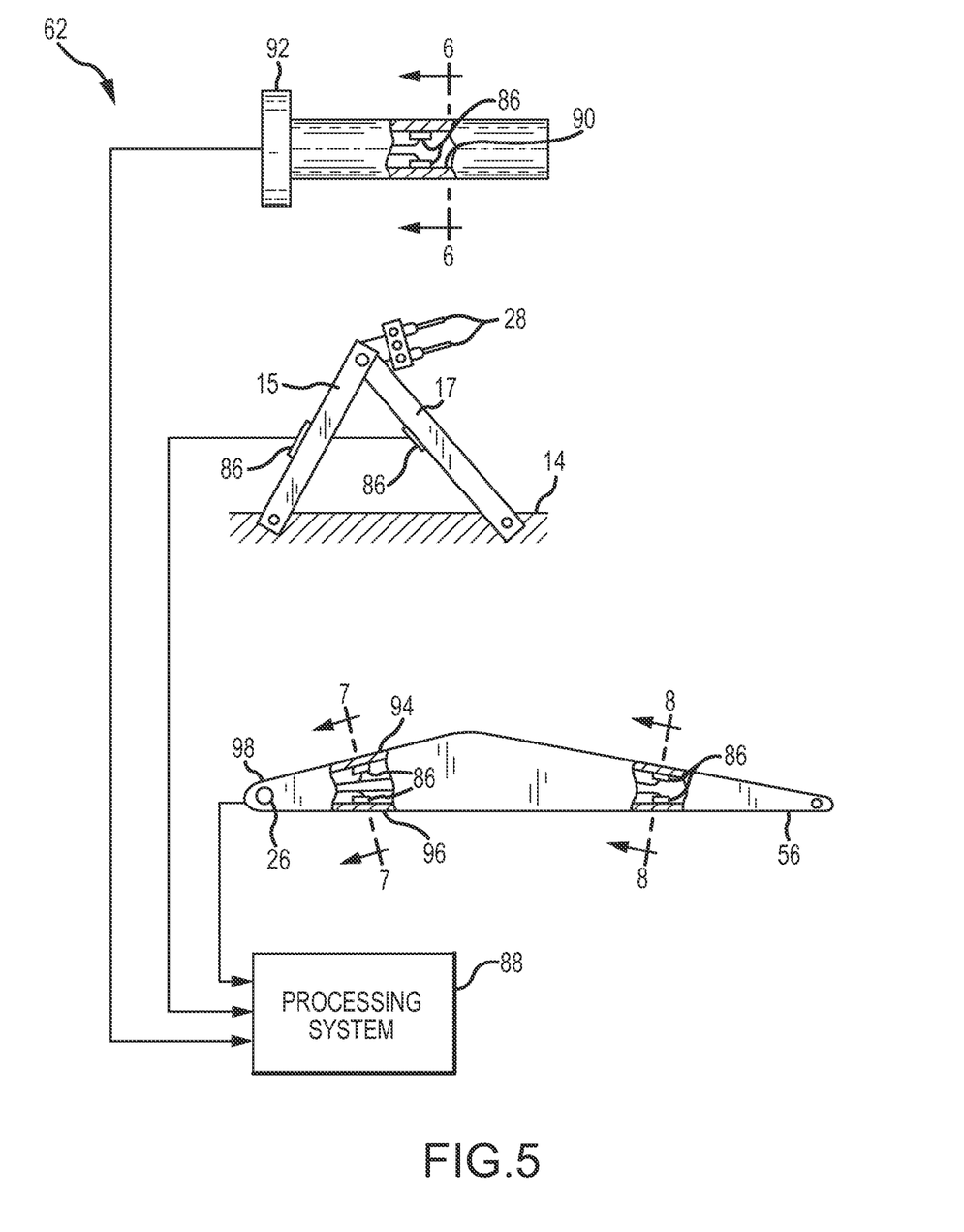
FIG. 5 is an illustration of a load sensing system according to one embodiment of the invention showing the placement of strain transducers on various members of the power shovel.

Referring now to FIGS. 2 and 5, the optimized bank penetration system 10 may also comprise a load sensing system 62 and a machine control system 64. Load sensing system 62 provides a means for determining various member joint loads imposed on shovel 12. In one embodiment, the load sensing system 62 comprises a plurality of strain transducers 86 mounted to various members of the shovel 12, as well as a processing system 88. The strain transducers 86 sense strain in various members of the shovel 12. The processing system 88 is programmed or configured to determine the loads imposed on the various member joints of the shovel 12 based on the strain measured or sensed by the various strain transducers 86.

Figure 4:
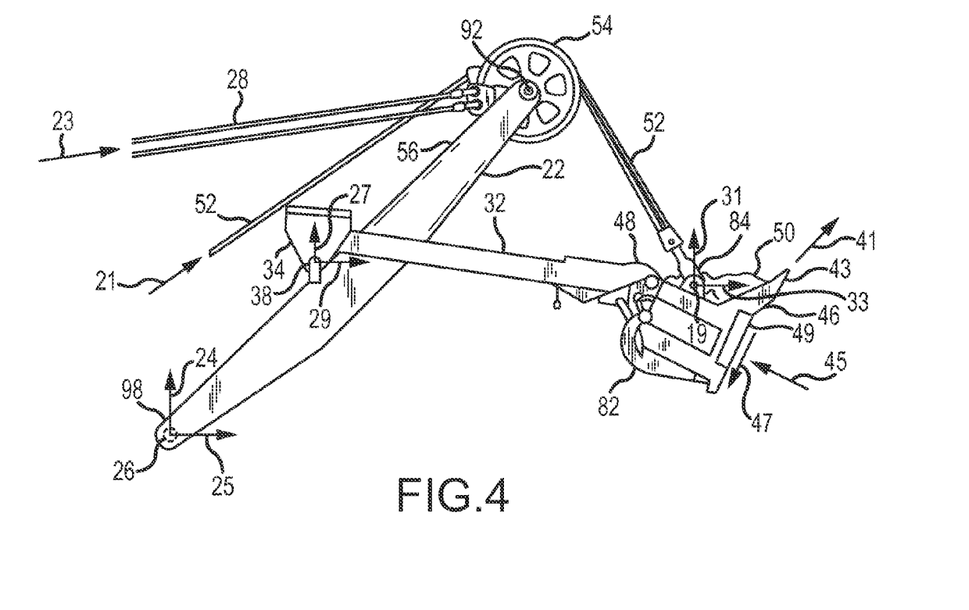
FIG. 4 is a free-body diagram of a boom-handle-dipper system of a power shovel showing various forces acting thereon.

In the particular embodiment shown and described herein, the various member joint loads can be determined from strain transducers 86 mounted at various locations in the boom 22. More specifically, a first or lower set of strain transducers 86 may be mounted near a lower end 98 of boom 22, as indicated by the line 7-7 in FIG. 5. Similarly, a second or upper set of strain transducers 86 may be mounted near the upper or distal end 56 of boom 22, as indicated by the line 8-8 in FIG. 5. The arrangement is such that the first and second sets of strain transducers 86 are mounted on opposite sides of the saddle block assembly 34 (not shown in FIG. 5, but shown in FIGS. 1 and 4).

Figure 7:
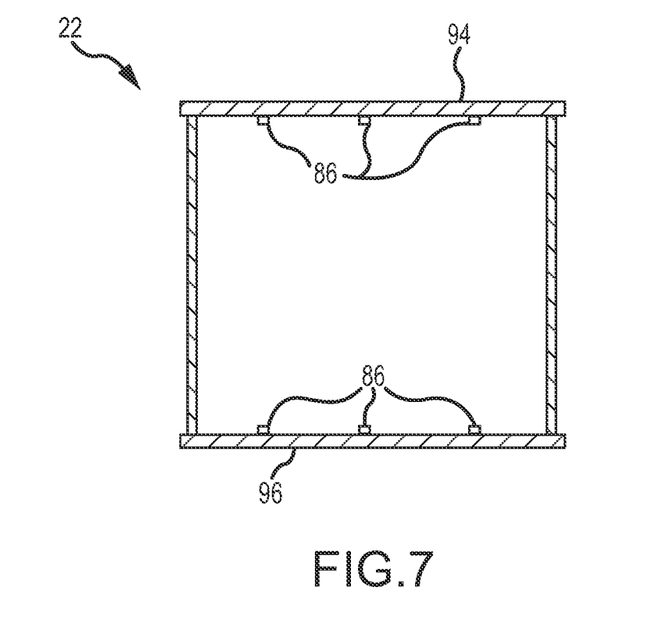
FIG. 7 is a cross-sectional view in elevation of a lower section of the boom taken along the line 7-7 of FIG. 5 more clearly showing the positional relationship of various strain transducers mounted thereto.

With reference now to FIGS. 5 and 7, the first or lower set of strain transducers 86 may be mounted to the top and bottom plates 94 and 96 of boom 22. In one embodiment, at least one, preferably two, and more preferably three, strain transducers 86 may be mounted to the top plate 94 of boom 22 in generally spaced-apart relation, as best seen in FIG. 7. Similarly, at least one, preferably two, and more preferably three, strain transducers 86 may be mounted to the bottom plate 96 of boom 22, also in generally spaced-apart relation. The strain transducers 86 mounted to the top plate 94 of boom 22 sense or measure the strain in the top plate 94, whereas the strain transducers 86 mounted to the bottom plate 96 of boom 22 sense or measure the strain in the bottom plate 96.

Figure 8:
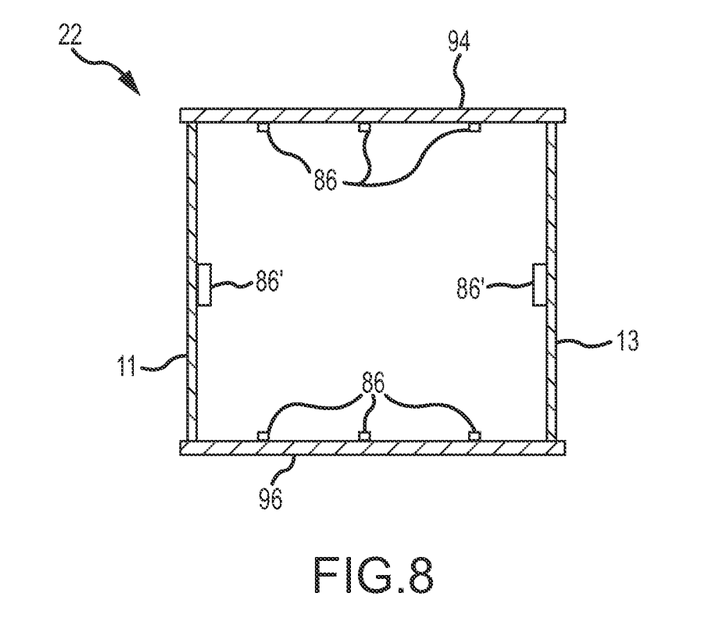
FIG. 8 is a cross-sectional view in elevation of an upper section of the boom taken along the line 8-8 of FIG. 5 more clearly showing the positional relationship of various strain transducers mounted thereto.

The second or upper set of strain transducers 86 are also mounted to the top and bottom plates 94 and 96 of boom 22, but at a position located near the upper or proximal end 56 of boom 22, as best seen with reference to FIGS. 5 and 8. Here again, at least one, preferably two or even three, strain transducers 86 may be mounted to each of the top and bottom plates 94 and 96, as best seen in FIG. 8. The strain transducers 86 mounted to the top and bottom plates 94 and 96 of boom 22 sense or measure the strain in the top and bottom plates 94 and 96, respectively. In addition, an optional set of strain transducers 86' may be mounted to the left and right side plates 11 and 13 of boom 22. If provided, the additional strain transducers 86' may be used to measure or determine shear flow in the upper portion of the boom 22 due to torsional loadings on boom 22.

Figure 6:
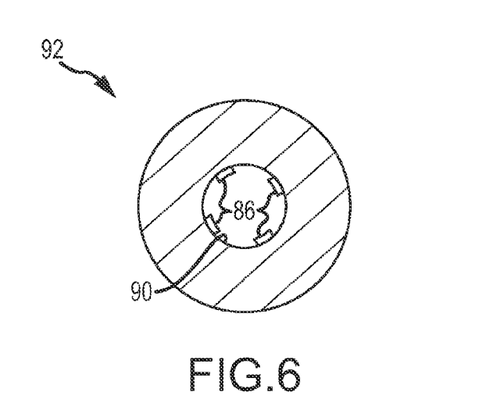
FIG. 6 is a cross-sectional view in elevation of a sheave pin taken along the line 6-6 of FIG. 5 more clearly showing the positional relationship of various strain transducers mounted therein.

In some embodiments it may be desirable to mount additional strain transducers 86 to other members of shovel 12, either to provide additional data or to serve as a cross-check for the loads calculated from the strain measured by the strain transducers 86 in the boom 22. For example, in one embodiment, additional strain transducers 86 may be mounted within an internal cavity 90 provided in sheave pin 92 that supports sheave 54, as best seen in FIGS. 5 and 6. Strain transducers 86 in the sheave pin 92 sense or measure strain in the sheave pin 92, which may be used by processing system 88 to calculate or determine the loading imposed on sheave 54 as well as the tension 21 (FIG. 4) in hoist rope 52.

Other strain transducers 86 may be mounted to various members 15 and 17 of back stay assembly 30, as best seen in FIG. 5. The strain transducers 86 sense or measure the strain in the various members 15 and 17 of back stay assembly 30, which may be used by the processing system 88 to calculate or determine the loading imposed on back stay assembly 30, as well as the tension 23 (FIG. 4) in the suspension ropes 28.

Strain transducers 86 may comprise any of a wide range of strain transducers or strain gauges that are well-known in the art or that may be developed in the future that are or would be suitable for measuring or sensing strain in structural members. Consequently, the present invention should not be regarded as limited to use with any particular type or style of strain transducer. However, by way of example, in one embodiment, each of the strain transducers 86 and 86' may comprise strain transducers available from Bridge Diagnostics, Inc., of Boulder, Colo., US.

Still referring to FIG. 5, processing system 88 is operatively connected to the various strain transducers 86 and is programmed or configured to calculate or determine the various member joint loads based on the strain data received from the various strain transducers 86. In one embodiment, processing system 88 may comprise a general purpose programmable computer, such as a personal computer, that is programmed or configured to calculate the various member joint loads, to implement the various processes and steps described herein, and to interface with the machine control system 64 (FIG. 2). However, because such general purpose programmable computers are well known in the art and could be easily provided by persons having ordinary skill in the art after having become familiar with the teachings provided herein, the particular programmable computer system that may comprise processing system 88, as well as the particulars of the various programs or processes that may be implemented by processing system 88, will not be described in further detail herein.

As already mentioned, the optimized bank penetration system 10 may also comprise a machine control system 64. Machine control system 64 interfaces with the load sensing system 62 and operates the various systems and actuators (e.g., the hoist actuator 58 and crowd actuator 60) of power shovel 12 in order to control the shovel 12 in accordance with the teachings provided herein. More specifically, the machine control system 64 operates the various actuators of shovel 12 in various load cases so that the loads imposed on the various member joints during operation do not exceed the corresponding maximum member joint loads. Significantly, however, the machine control system 64 may command or permit the various actuators (e.g., hoist actuator 58 and/or crowd actuator 60) of shovel 12 to apply forces (e.g., hoist rope and/or crowd forces) to the various members in excess of the forces that would otherwise be permitted in the maximum load case, all while maintaining the member joint loads at or below the maximum member joint loads.

Before proceeding with the description it should be noted that, depending on the particular power shovel 12 on which the system 10 is utilized, machine control system 64 may comprise all or a portion of an existing control system (not shown) that is used to operate the power shovel 12. Alternatively, a separate machine control system 64 may be provided, either to work in conjunction with such an existing control system or to replace the existing control system.

In an embodiment wherein the machine control system 64 comprises an existing shovel control system, then the load sensing system 62 may be configured or programmed to interface with the existing system so that the existing system can operate the shovel in accordance with the teachings described herein. The existing machine control system 64 may need to be reconfigured or reprogrammed as necessary to interface with the load sensing system 62 and to implement the various methods of the optimized bank penetration system 10. In an embodiment wherein the machine control system 64 comprises or utilizes a portion of an existing shovel control system, then the machine control system 64 may include or be provided with a suitable auxiliary processing and interface system (not shown) to allow the load sensing system 62 to interface with the existing shovel control system. However, because the details of such methods and systems for interfacing with existing machine control systems would become apparent to persons having ordinary skill in the art after having become familiar with the teachings provided herein, the particular systems and methods that may be used to interface with an existing shovel control system will not be described in further detail herein.

Referring now to FIG. 3, the optimized bank penetration system 10 may be operated in conjunction with method 66 in order to operate the shovel 12. The first step 68 in method 66 involves determining a maximum load case for the shovel. As mentioned above, the maximum load case for a shovel typically involves a specific machine configuration, payload state, and applied forces (e.g., hoist forces and/or crowd forces) that exert maximum loads and bending moments on the various structures of power shovel 12. In many embodiments, the maximum load case may be determined empirically from the specifications for the particular shovel involved. In other embodiments, the maximum load case may already be known for the particular shovel. In the particular embodiment shown and described herein, the maximum load case for the power shovel is depicted in FIG. 1.

Figure 13:
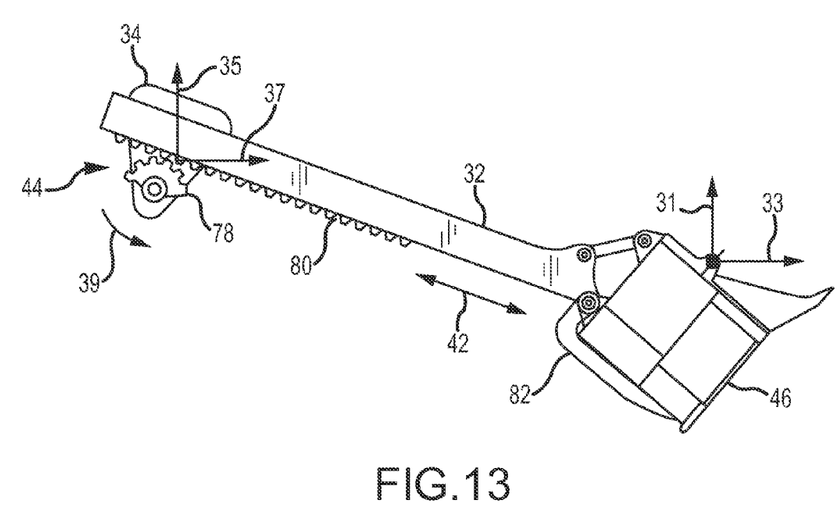
FIG. 13 is a statically determinate free body diagram of a handle-dipper system.

After the maximum load case has been determined, the corresponding loads in each of the member joints of the shovel 12 may be determined at step 70. As mentioned earlier, the loads in the various joints in the maximum load case are referred to herein as "maximum member joint loads." With reference now primarily to FIG. 4, exemplary maximum member joint loads that may be determined in step 70 include, but are not limited to, the reaction forces 24 and 25 at the boom foot joint 26, reaction forces 27 and 29 at the saddle block pivot joint 38, and reaction forces 31 and 33 at the bail pin 19. Additional loads that may be determined for the maximum load case include the tensions 21 and 23 in the hoist and suspension ropes 52 and 28, the tension and compression forces (not shown) in the various members 15 and 17 of back stay assembly 30 (FIG. 5), as well as the reaction forces 35, 37 and torque 39 at the drive pinion 78 (FIG. 13).

The maximum member joint loads may be determined by an appropriate structural analysis of the various members of the power shovel 12 in the maximum load case. However, because the particular maximum member joint loads will depend on the particular power shovel involved and could be readily determined by persons having ordinary skill in the art after having become familiar with the teachings provided herein, the particular structural analysis that may be used to determine the various maximum member joint loads in one embodiment will not be discussed in further detail herein.

Referring back now to FIG. 3, after the various maximum member joint loads for the maximum load case have been determined, the method 66 proceeds to step 72 which involves operation of the shovel 12 so as not to exceed the maximum member joint load in any load case, not just the maximum load case. In the particular embodiment shown and described herein, the various member joint loads may be determined and/or monitored during shovel operation (i.e., "on the fly") by the load sensing system 62. The machine control system 64 will then operate the hoist and crowd actuators 58 and 60 in various load cases so that the member joint loads measured during shovel operation remain below the maximum member joint loads. As discussed above, in many load cases this means that the machine control system 64 will apply hoist and/or crowd forces that exceed the hoist and/or crowd forces that would be permitted in the maximum load case.

The various member joint loads (as distinct from the maximum member joint loads), may be determined or calculated during shovel operation from the strain measured or sensed in the various members of the shovel 12 by the various strain transducers 86, 86'. In an embodiment wherein the optimized bank penetration system 10 is to control the operation of the hoist and crowd actuators 58 and 60, then it will only be necessary to mount strain transducers 86, 86' in the boom member 22 at two locations, 7-7 and 8-8, as already described. The processing system 88 would then calculate or determine the various member joint loads in accordance with standard structural analysis techniques based on the strain sensed in the boom 22. Thereafter, the processing system 88 may determine the load on at least one member of the power shovel 12 based on the calculated member joint loads.

Figure 12:
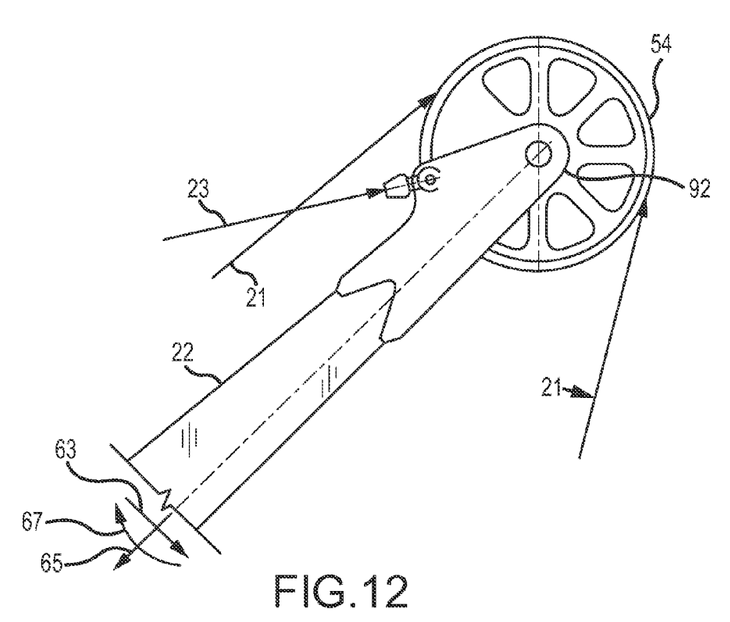
FIG. 12 is a free-body diagram of the boom point sheave system showing the hoist and suspension rope tensions that may be determined from the strain transducers located in the upper section of the boom.

Processing system 88 may also determine the tensions 21 and 23 in both the hoist and suspension ropes 52 and 28 from the strain sensed in the boom 22. If additional strain transducers 86 have been provided to other members of the shovel 12, as described above, then processing system 88 may be programmed to use the strain sensed in such other members to calculate other loads, either for cross-checking purposes or for ease of calibration. For example, the tension 21 in hoist rope 52 as well as the loading on the sheave 54 may be determined and/or monitored during shovel operation from the strain sensed in the sheave pin 92. Such loadings may be determined with the aid of a free body diagram for the upper boom section, as depicted in FIG. 12. Likewise, the tension 23 in the suspension ropes 26 as well as the loading on the back stay assembly 30 may be determined and/or monitored by the processing system 88 during shovel operation from the strain sensed in the back stay assembly 30.

Instrumenting the shovel 12 in the manner shown and described herein will allow the processing system 88 to continuously determine the following member joint loads and/or member loads during operation of the shovel 12:

Reaction forces 24, 25 at the boom foot joint 26;
Reaction forces 35, 37 and torque 39 at the crowd pinion gear 78;
Reaction forces 31, 33 at bail pin 19;
Tension 21 in the hoist rope(s) 52;
Tension 23 in the suspension rope(s) 28;
Tension and compression forces (not shown) in the back stay assembly 30;
Cutting force 41 at the dipper teeth 43;
Normal force 45 and shear force 47 on the face 49 of dipper 46; and
Dipper payload 50 while in the bank 78.

Knowledge of these member joint loads and member loads will allow the optimized bank penetration system 10 to expand the performance envelope of the shovel 12 over a wide range of load cases. In addition, knowledge of these loads will allow the optimized bank penetration system 10 to perform real-time fatigue monitoring as well as shovel operator characterization.

A method for performing fatigue analysis according to one embodiment of the invention may involve converting the various member joint loads in the shovel 12 to equivalent axial loads and bending moments in various members of the shovel. This type of conversion may be accomplished by conventional structural analysis techniques well-known to persons having ordinary skill in the art. Thereafter, a cycle counting algorithm, such as a Rainflow counting algorithm, may be applied to the various equivalent axial loads and bending moments to reduce a spectrum of varying axial loads and bending moments (i.e., as determined from the "on-the-fly" measurements of the various member strains) into a set of axial load and bending moment reversals. The fatigue analysis method may also involve determining an S-N curve from material and geometry data specific to the particular power shovel involved. As is known, an S-N curve is a graph or map relating elastic stress (S) imposed on a material to the number of cycles (N) to cause failure. Thereafter, a fatigue life of a particular member of the shovel 12 may be determined or estimated from the set of axial load and bending moment reversals and the developed S-N curve. A durability analysis can also be performed based on the various member joint loads.

Figure 9:
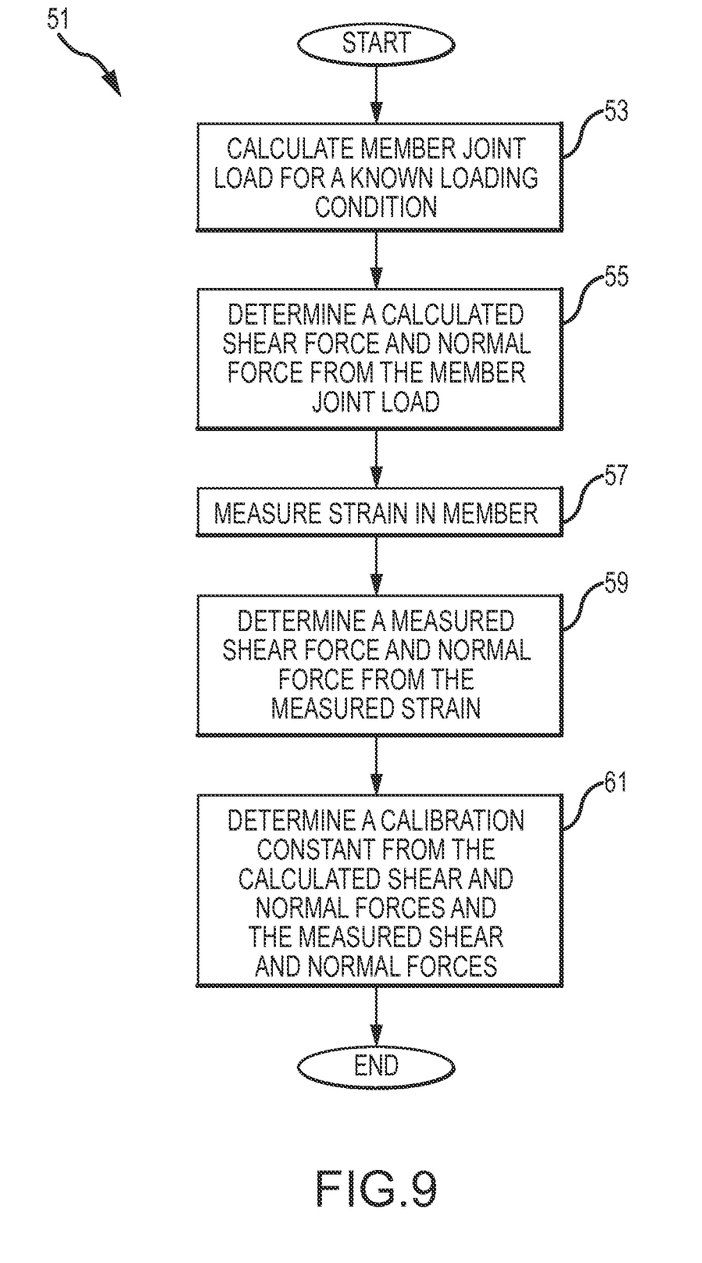
FIG. 9 is a flow chart representation of one embodiment of a method of determining a calibration constant.

In order for the processing system 88 to determine or calculate the various member joint loads and member loads from the strain measured or sensed by the various strain transducers 86, 86', the various strain transducers 86, 86' must first be calibrated. A calibration process 51 that may be utilized in one embodiment of the invention is illustrated in FIG. 9 and may be used to determine a calibration constant for the processing system 88. A first step 53 in calibration process 51 may involve the calculation of various member joint loads for a known loading condition. Preferably, this step 53 is performed for a statically determinate loading condition, such as, for example, when the shovel is in a "swing-to-tuck" position, with an empty dipper 46. In such a configuration, there are no external loadings on the shovel 12. Further, the weights and centroids of the various members of the shovel will be known (or can be readily determined) for such a configuration, as will the relative positioning of the various members to a defined coordinate system. Therefore, the various member joint loads can be easily determined when the shovel 12 is in such a state. In this regard it should be noted that the body forces or weights of the various members of the shovel 12 act vertically downward. Inclinometers (not shown) may be mounted to various locations of the shovel 12 to measure fore and aft inclination to correct for any tilt of the shovel. Alternatively, other devices and methods may be used to determine the relative positioning of the shovel 12 relative to the particular coordinate system involved, as would become apparent to persons having ordinary skill in the art after having become familiar with the teachings provided herein.

Continuing now with the description, at step 55, the various member joint loads may be used to determine a calculated shear force and a calculated normal force in a desired member of the shovel. For example, and with reference to FIG. 12, step 55 may involve calculating shear force 63 and normal or axial force 65 existing at a cross-section of the boom 22. The shear force 63 generates a bending moment 67 in boom 22, whereas the normal or axial force 65 produces a tension or compression on the member. The measured strain is a superposition of both. Again, any of a wide range of structural analysis techniques that are well-known in the art may be used to determine the various member joint loads and corresponding shear and normal forces determined in steps 53 and 55.

Thereafter, the calibration process 51 proceeds to step 57 which involves measuring the actual strain in the members of the shovel 12. The strain in the various members is measured by the strain transducers 86, 86' in the manner already described. However, before proceeding with the description, it should be noted that while the various strain transducers may be calibrated in advance of installation, i.e., to account for variations within the strain transducers themselves, such an advance calibration will not usually account for mounting variations that may be encountered in a retro-fit situations wherein strain transducers 86 must be mounted to members of an existing shovel already in the field. In such cases, the processing system must correct or compensate for variations in the mounting locations of the various strain transducers 86.

Figure 10:
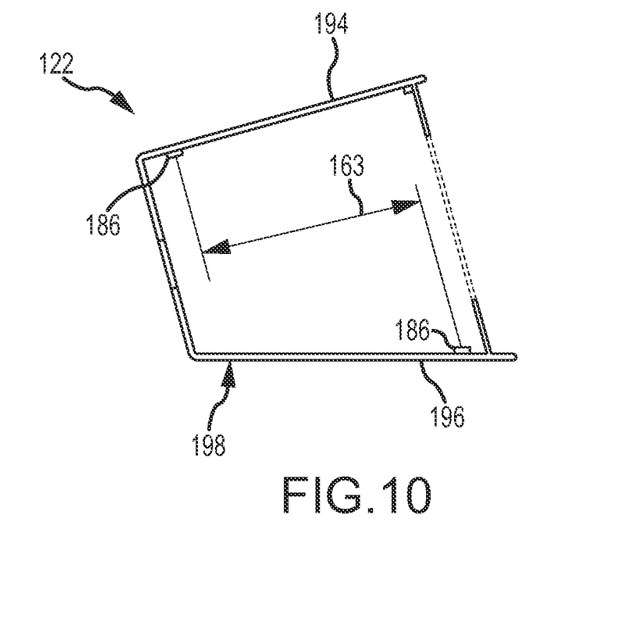
FIG. 10 is a cross-sectional side view in elevation of a lower section of an in-service boom showing displaced positioning of various strain transducers due to the presence of various internal components.
Figure 11:
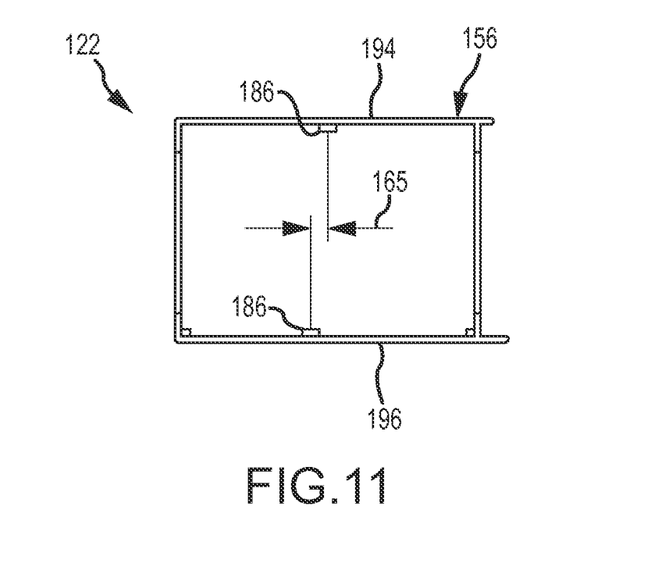
FIG. 11 is a cross-sectional side view in elevation of an upper section of an in-service boom showing displaced positioning of various strain transducers due to the presence of various internal components.

For example, and with reference now to FIGS. 10 and 11, a field installation of various strain transducers 186 in an existing boom 122 may not permit the strain transducers 186 to be mounted in alignment with one another (i.e., compared to the mounting arrangements illustrated in FIGS. 7 and 8). Moreover, such field misalignments may vary depending on the location in the boom 122, i.e., between the lower and upper strain transducer mounting locations 198 and 156 in the boom 122.

Referring now primarily to FIG. 10, in an actual field installation, the strain transducers 186 mounted to the top plate 194 of the lower portion 198 of boom 122 are displaced or offset by a distance 163 compared to the strain transducers 186 mounted to the lower plate 196. The offset distance 163 was required due to the presence of compression buckling of the lower plate 196 of boom 122. Similarly, and with reference now to FIG. 11, the strain transducers 186 mounted to the top and bottom plates 194 and 196 of the upper portion 156 of boom 122 are displaced or offset from one another by a distance 165. In this case, the displacement arose due to the presence of internal lubrication piping within the boom 122.

If a particular installation involves such an offset of the various strain transducers 186, then the offset must be compensated for or taken into account so the various loadings determined from the sensed strains are accurate. Such a compensation can be arrived at by any of a wide range of structural analytical techniques well-known in the art. For example, in one embodiment, such displacement or off-sets may be compensated for by solving for the normal and shear forces on an inclined plane between a line constructed between the upper and lower strain transducers 186. Determinations for moments of inertia, centroids, areas, and moment arms in the structural analysis will then be based on the inclined plane. The forces may then be transformed from a coordinate system of the inclined plane into the particular boom coordinate system that is used. Here again, since such analytical techniques are well within the level of ordinary skill in the art, the particular analytical techniques that may be used to compensate for any offset involved in the placement of the various strain transducers 186 will not be described in further detail herein.

Referring back now to FIG. 9, step 59 of calibration process 51 involves the determination of measured shear and normal forces in a member from the measured strain in the member. For example, the shear and normal forces 63 and 65 (FIG. 12) in the boom 22 can be determined based on the strain detected or measured by the corresponding strain transducers 86, the strain being a superposition of the shear and normal forces 63 and 65. The calibration constant is then determined at step 61 based on the calculated shear and normal forces from the known joint loads (e.g., from step 55) and the measured shear and normal forces from the measured strain (e.g., from step 59). In one embodiment, the calibration constant obtained by dividing the calculated shear and normal forces from the known joint loads by the measured shear and normal forces from the measured strain.

Advantageously, the calibration method or process 51 may be performed periodically or even continuously in the field, i.e., during operation of the shovel 12. The calculated member joint loads may be determined during a "swing-to-tuck" operational sequence of the shovel 12. The various member joint loads can then be used to calculate or determine the expected strain at each of the strain transducers 86. The expected strain can then be compared to the actual measured strain to continuously adjust or fine tune the calibration constant for each strain transducer 86.

Once the optimized bank penetration system 10 has been calibrated, the shovel 12 may be operated in accordance with the teachings provided herein. In an embodiment wherein the optimized bank penetration system 10 is to control the operation of the hoist and/or crowd actuators 58 and/or 60, then it would be necessary to instrument only the boom 22 (e.g., with strain transducers 86). The load sensing system 62 would then calculate the relevant member joint loads in accordance with the methodologies described herein. Machine control system 64 would then operate the hoist and crowd actuators 58 and 60 in various load cases so that the member joint loads remain below the maximum member joint loads, e.g., by continuous sensing or monitoring of the actual strain in the upper and lower sections of the boom 22 as sensed by the various strain transducers 86. As discussed above, in many load cases this means that the machine control system 64 will be able to apply hoist and/or crowd forces that exceed the hoist and/or crowd forces permitted in the maximum load case. So operating the shovel 12 will expand the performance envelope of the shovel.

If other member joint loads are to be determined and/or monitored, either to further increase the performance envelope of the shovel 12, improve the calibration accuracy, or for fatigue monitoring purposes, then such other members or elements of the shovel 12 may be instrumented, as described herein. Such additional strain transducers and/or instrumentation could also be used to provide a cross-check and/or redundancy in the calculation of the member joint loads to ensure that they will be maintained below the maximum member joint loads during operation of the shovel 12. In still other embodiments, such additional strain transducers and/or instrumentation may be used to provide additional functionality and/or control of the shovel 12. For example, strain transducers 86 provided on the back stay assembly 30 may be used to determine if the tension 23 in the suspension ropes 28 has fallen below a predetermined value, which may be indicative of "boom jacking" in which the hoist and/or crowd forces are sufficiently high so as to begin to raise the boom 22. If such a condition is sensed, the machine control system 64 could reduce the hoist and/or crowd forces to ameliorate the condition.

Having herein set forth preferred embodiments of the present invention, it is anticipated that suitable modifications can be made thereto which will nonetheless remain within the scope of the invention. The invention shall therefore only be construed in accordance with the following claims.

What is claimed is:

1. A method of determining a load on at least one member of a power shovel, comprising:
sensing a strain in a boom of the power shovel;
determining a plurality of member joint loads based on strain sensed in the boom;
performing fatigue analysis from the plurality of member joint loads by at least:

converting the plurality of member joint loads into equivalent axial loads and bending moments;

applying a cycle counting algorithm to the equivalent axial loads and bending moments to reduce a spectrum of varying axial loads and bending moments into a set of axial load and bending moment reversals;

from material and geometry data for the power shovel, mapping a magnitude of elastic stress (S) against number of cycles (N) to material failure, resulting in an S-N curve; and estimating fatigue life of the at least one member from the set of axial load and bending moment reversals and the S-N curve;

determining the load on the at least one member of the power shovel from the plurality of member joint loads resulting in a calculated load; and using a controller operatively associated with the power shovel to control power shovel operation by utilizing at least the calculated load.

2. The method of claim 1, further comprising determining a hoist rope tension from strain sensed in the boom.

3. The method of claim 1, further comprising determining a suspension rope tension from strain sensed in the boom.

4. The method of claim 3, further comprising determining a boom jacking condition from the suspension rope tension.

5. The method of claim 1, further comprising determining a hoist rope tension from strain sensed in a sheave pin of the power shovel.

6. The method of claim 1, further comprising determining a suspension rope tension from strain sensed in a back stay of the power shovel.

7. The method of claim 6, further comprising determining a boom jacking condition from the suspension rope tension.

8. The method of claim 1, further comprising estimating damage from the set of axial load and bending moment reversals and the S-N curve.

9. The method of claim 1, wherein applying a cycle counting algorithm comprises applying a Rainflow counting algorithm.

10. The method of claim 1, further comprising performing a durability analysis based on the plurality of member joint loads.

* * * * *